(12) United States Patent
Nicholson et al.

(10) Patent No.: US 9,342,184 B2
(45) Date of Patent: May 17, 2016

(54) MANAGING MULTIPLE TOUCH SOURCES WITH PALM REJECTION

(71) Applicant: LENOVO (Singapore) PTE, LTD., New Tech Park (SG)

(72) Inventors: John Weldon Nicholson, Cary, NC (US); Matthew Lloyd Hagenbuch, Durham, NC (US); Howard Locker, Cary, NC (US); Matthew Price Roper, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 73 days.

(21) Appl. No.: 14/139,320

(22) Filed: Dec. 23, 2013

(65) Prior Publication Data

US 2015/0177870 A1   Jun. 25, 2015

(51) Int. Cl.
*G06F 3/045*   (2006.01)
*G06F 3/041*   (2006.01)

(52) U.S. Cl.
CPC .............. *G06F 3/0418* (2013.01); *G06F 3/041* (2013.01); *G06F 2203/04104* (2013.01)

(58) Field of Classification Search
CPC ..... G06F 3/03545; G06F 3/041; G06F 3/048; G06F 3/0488; G06F 2200/1632; G06F 2203/0318; G06F 2203/04104; G06F 2203/04106; G06F 2203/048; G06F 2203/04808; G06F 2203/047104; G08C 21/00
See application file for complete search history.

(56) References Cited

U.S. PATENT DOCUMENTS

| | | | |
|---|---|---|---|
| 2005/0162410 A1* | 7/2005 | Johnson et al. | 345/174 |
| 2006/0227116 A1* | 10/2006 | Zotov et al. | 345/173 |
| 2011/0012855 A1* | 1/2011 | Yeh | G06F 3/0416 345/173 |
| 2012/0262407 A1* | 10/2012 | Hinckley | G06F 3/038 345/173 |
| 2012/0313865 A1* | 12/2012 | Pearce | 345/173 |
| 2013/0207905 A1* | 8/2013 | Hankins | G06F 3/041 345/173 |
| 2013/0300672 A1* | 11/2013 | Griffin | G06F 3/04883 345/173 |
| 2013/0300696 A1* | 11/2013 | Haran et al. | 345/173 |
| 2014/0015779 A1* | 1/2014 | Yang et al. | 345/173 |
| 2014/0022193 A1* | 1/2014 | Kim et al. | 345/173 |
| 2014/0035845 A1* | 2/2014 | Kameyama | G06F 3/041 345/173 |
| 2014/0092045 A1* | 4/2014 | Ananthapadmanabh et al. | 345/173 |
| 2014/0104320 A1* | 4/2014 | Davidson et al. | 345/681 |
| 2014/0125615 A1* | 5/2014 | Sato et al. | 345/173 |
| 2014/0152594 A1* | 6/2014 | Kim | 345/173 |
| 2014/0191983 A1* | 7/2014 | Choi et al. | 345/173 |
| 2014/0267078 A1* | 9/2014 | Kukulski et al. | 345/173 |
| 2015/0062206 A1* | 3/2015 | Osborne | 345/698 |

* cited by examiner

*Primary Examiner* — Joe H Cheng
(74) *Attorney, Agent, or Firm* — Kunzler Law Group (57) ABSTRACT

For managing multiple touch sources with palm rejection, a method is disclosed that includes detecting an instrument touch on a touch screen of a computing device, the instrument touch performed by a handheld instrument, disabling user touch for a portion of the touch screen, the disabled portion selected in accordance with a usage pattern, and accepting a user touch of the touch screen outside of the disabled portion.

21 Claims, 10 Drawing Sheets

MANAGING MULTIPLE TOUCH SOURCES WITH PALM REJECTION

BACKGROUND

1. Field

The subject matter disclosed herein relates to using a touch interface and more particularly relates to managing multiple touch sources with palm rejection.

2. Description of the Related Art

In general, computing device may be configured with a touch based input capability. A computing device with a touch based interface, or input system, may allow a user to communicate with the computing device. Through a touch interface, a user may change settings, execute programs, respond to notifications, or operate the computing device in another way. As the accuracy and sensitivity of touch based technologies increases, more computing devices may offer a touch based interface.

Some computing devices incorporate multiple touch interfaces. For example, a computing device may include a handheld instrument, such as a magnetic resonance pen, with a capacitive touch interface at the touch screen. When a user is using the handheld instrument for the magnetic resonance touch interface, a user may touch the screen with a wrist or palm. This touch may activate other features or cause the computing device to behave unexpectedly. In order to address this issue, computing devices with multiple touch interfaces typically disable one or another touch interface, depending on the current activity of a user.

In one solution to palm rejection, a user touch interface is disabled while a user is using the handheld instrument, or while a touch instrument is within a certain range of the touch screen. This may reject user touches (e.g. palm rejection) while still allowing a user to communicate with the computing device using the handheld instrument. Disabling a user touch interface while a user may be using a handheld instrument does not allow a user to communicate with the device using user touch while the touch instrument is active.

In another solution to palm rejection, some systems ignore user touches that encompass a large area. A "large" area touch may frequently be associated with a size of a user's palm, wrist, forearm, or the like. Some computing devices provide palm rejection by simply ignoring such large touches. However, distinguishing between "large" touches that may not be intended touches, and other similarly sized touches that may be intended touches, may be difficult and may cause a computing device to reject touches that are intended touches by a user. For example, a large touch may begin as a small touch and grow as a user fully touches the touch screen. Also, a multi-touch action, or a gesture by a user on a touch screen may appear as a large touch. Therefore, additional methods are necessary for adequate management of multiple touch sources with palm rejection.

BRIEF SUMMARY

An apparatus for managing multiple touch sources with palm rejection is disclosed. A method and computer program product also perform the functions of the apparatus. In one embodiment, an apparatus includes a processor, a screen, and an instrument touch module configured to detect, at the touch screen, a touch from a handheld instrument. In another embodiment, the apparatus includes a user touch module configured to disable a portion of the touch screen in response to the instrument touch, the disabled portion based on a usage pattern.

In a further embodiment, the portion of the screen is further based on one or more of a location of the instrument touch, and an orientation of the handheld instrument. In one embodiment, the apparatus further includes a pattern module configured to store one or more usage patterns. In another embodiment, the user touch module selects the usage pattern from the one or more usage patterns based on user interaction.

In one embodiment, the pattern module is further configured to receive the one or more usage patterns from a remote usage pattern server. In another embodiment, pattern module further includes a learning module, the learning module configured to generate the usage pattern based on training with a user. In a further embodiment, the training including the user executing a training application.

In one embodiment, the pattern module is further configured to transmit the generated usage pattern to a remote usage pattern server. In another embodiment, the learning module adjusts a usage pattern based on one or more of crowd sourcing and historical use of the apparatus on historical use of the apparatus. In another example, the remote usage pattern server may generate another usage pattern based on the received usage patterns from one or more learning modules. In one example, a learning module, or a remote usage pattern server may generate additional usage patterns using crowd sourcing.

A method is for managing multiple touch sources with palm rejection is disclosed. In one embodiment, the method includes detecting an instrument touch on a touch screen of a computing device, the instrument touch performed by a handheld instrument. In another embodiment, the method includes disabling user touch for a portion of the touch screen, the disabled portion selected in accordance with a usage pattern. In a further embodiment, the method includes accepting a user touch of the touch screen outside of the disabled portion.

In one embodiment, the method includes learning a usage pattern from a user of the computing device, the disabled portion based on the learned usage pattern. In another embodiment, the method further includes transmitting the learned usage pattern to a remote usage pattern server. In a further embodiment, the method includes receiving one or more usage patterns from a remote usage pattern server. In one embodiment, the method includes adjusting the usage pattern based on historical use of the computing device. In another embodiment, the disabled portion is further based on one or more of a location of the instrument touch, and an orientation of the handheld instrument.

A program product is disclosed including a computer readable storage medium storing machine readable code executable by a processor. In one embodiment, the code performs detecting an instrument touch on a touch screen of a computing device, the instrument touch performed by a handheld instrument. In another embodiment, the code performs disabling user touch for a portion of the touch screen, the disabled portion selected in accordance with a usage pattern. In a further embodiment, the code performs accepting a user touch of the touch screen outside of the disabled portion.

In one embodiment, the code performs learning a usage pattern from a user of the computing device, the disabled portion based on the learned usage pattern. In another embodiment, the machine readable code performs receiving the usage pattern from a remote usage pattern server. In a further embodiment, the machine readable code performs transmitting a learned usage pattern to a remote usage pattern server.

In one embodiment, the machine readable code performs adjusting the usage pattern based on historical use of the computing device. In another embodiment, the disabled portion is further based on one or more of a location of the instrument touch, and an orientation of the handheld instrument.

A method is disclosed including receiving one or more usage patterns from one or more learning modules, generating an additional usage pattern by combining one or more of the received usage patterns, the combining using one or more of statistical averaging, crowd sourcing, and heuristic modeling, and transmitting the additional usage pattern to one of the learning modules.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of Figures may refer to elements described in previous Figures, like numbers referring to like elements.

In order to address the current state of the art, the present application disclose several embodiments of a method, system, and apparatus for managing multiple touch sources with palm rejection. A computing device may include Computing device at least means a device capable of performing logic operations. A computing device may include a process, memory, display, or the like. For example, a computing device, may be a personal computer, a handheld computer, a mobile device, a cellular phone, a tablet computer, a laptop computer, or other, or the like. A computing device, as described herein, may also include one or more touch based inputs for the screen. A touch based input may include a touch sensor with a module for communicating with the touch sensor. This may allow a user to interface with the computing device, by touching the screen to select buttons, type, input text, draw a line, select icons, execute a program, change a setting, respond to a notification, or the like.

A touch, as described herein, may mean at least interacting with the computing device so as to cause one or more touch sensors to detect a touch. In some embodiment, a touch may include physically contacting a touch sensor of the computing device. For example, a resistive touch sensor may detect a touch after a finger pressed on the resistive touch sensor. In another embodiment, a touch may include coming close to the touch sensor, but not physically contacting the touch sensor. For example, a capacitive touch sensor may detect a touch if a finger comes close enough to the capacitive touch sensor to affect the capacitance of the touch sensor. In another example, a touch sensor that includes a touch instrument with a magnetic resonance pen, may detect a disturbance in a magnetic field based on the touch instrument coming close to a magnetic resonance touch sensor. Therefore, a "touch" a described herein, is not limited to any kind of physical contact, and any spatial proximity that affects a touch sensor of any kind may be considered a touch, even if from some distance away from the computing device.

An instrument touch, as described herein, may include causing a handheld instrument to register a touch at the computing device. An instrument touch, may or may not include a handheld instrument physically contacting a touch screen of the computing device. For example, a capacitive based touch sensor, may register a touch by a finger of a user before the finger physically contacts the touch screen. In another example, an active stylus may communicate with a touch sensor from a distance away from the touch screen, and may register a touch at the touch screen without physically contacting the touch screen. One skilled in the art may recognize other ways a user may effectuate a touch via a handheld instrument and this disclosure is not limited in this regard. Therefore, in certain embodiments, a touch may include interacting with a touch sensor so as to cause the touch sensor to register a touch, even though the touch may not include physical contact with the touch screen.

A user touch, as described herein, may include a user touching a touch screen of the computing device using a finger, thumb, other, or the like. A user touch may or may not include a finger physically contacting a touch screen of the computing device. One skilled in the art may recognize other ways a user may effectuate a touch via a touch screen of the computing device and this disclosure is not limited in this regard.

As described herein, a touch sensor may include a variety of different touch technologies. A touch sensor may include resistive technologies such as two electrically-resistive layers separated by a thin space. A touch may be sensed by applying a voltage to one of the layers and detecting a voltage change when a portion of one of the layers comes in contact with the other layer based on the layer being physically moved.

A touch sensor may include surface acoustic wave technologies that may use ultrasonic saves that pass over a screen. A physical object approaching the screen may obstruct or absorb a portion of the ultrasonic wave. A change in the ultrasonic wave may be detected by the touch sensor.

A touch sensor may include capacitive touch technologies such as a panel of glass coated with a transparent conductor. A capacitive touch sensor may detect a distortion of an electrostatic field based on a change in capacitance. A capacitive touch sensor may not detect a touch by a physical object that is an electrical insulator. A capacitive touch sensor may be based on capacitive coupling, surface capacitance, projected capacitance, mutual capacitance, self-capacitance, or the like.

A touch sensor may include an infrared grid using an array of infrared LED's and photodetector pairs on the edges of a screen. A touch sensor may include infrared acrylic projection, optical imaging, dispersive signal technology, acoustic pulse recognition, or the like.

In one embodiment, a touch module may be a module that communicates with a touch sensor. In another embodiment, a touch module may include a touch sensor. In one embodiment, a first touch module may be configured to detect, at a screen, a touch based on a touch sensor type. A touch sensor type may include any of the previously described touch sensors. In another embodiment, a second touch module configured to detect a touch based on a second touch sensor type. In one embodiment, the first touch sensor type may be different than the second touch sensor type. In another embodiment, an apparatus may include an integration module configured to concurrently process input from two or more of the first touch module and the second touch module. Having the benefit of this application, one skilled in the art would be able to make user of both the first touch module and the second touch module simultaneously, or concurrently. In another embodiment, the input from the second touch module and the first touch module may be received concurrently.

Figure 1:
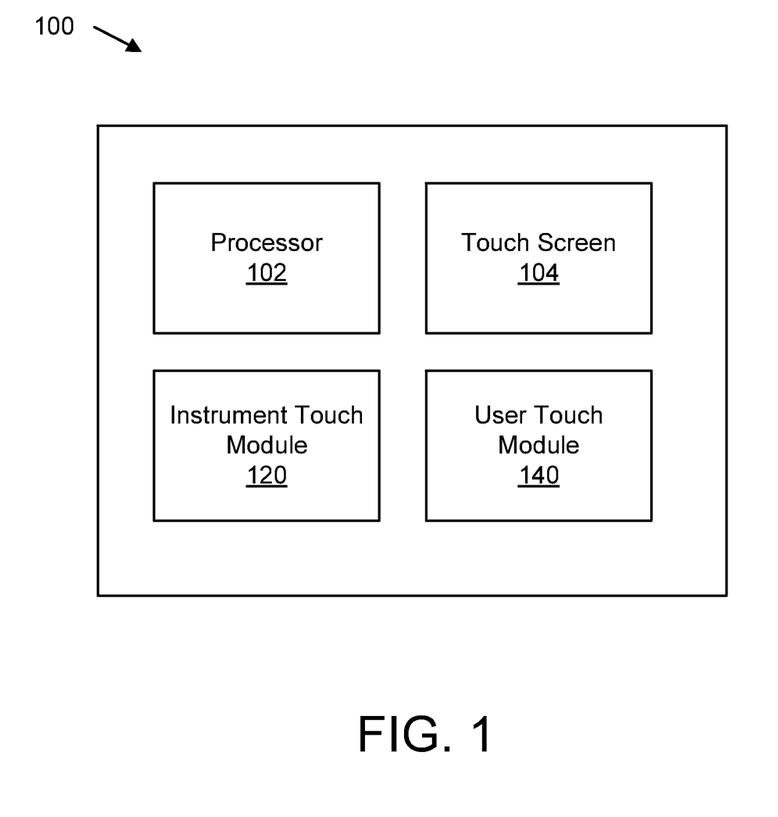
FIG. 1 is a schematic block diagram illustrating one embodiment of an apparatus for managing multiple touch sources with palm rejection.

FIG. 1 is a schematic block diagram illustrating one embodiment 100 of an apparatus for managing multiple touch sources with palm rejection. In one embodiment, the apparatus 100 includes a processor 102, a touch screen 104, an instrument touch module 120, and a user touch module 140. In another embodiment, the processor 102 may be any of the types or processors previously described. In a further embodiment, a touch screen 104 may communicate with any of the previously described touch sensors, a combination of touch sensors, or the like.

In one embodiment, the apparatus 100 includes an instrument touch module 120. The instrument touch module 120 may be configured to detect a touch from a handheld instrument. In one example, the touch from the handheld instrument may be at a touch screen of the apparatus 100. In one example, a handheld instrument may be a magnetic resonance pen, an active stylus, a passive stylus, other touch instrument, other handheld instrument, or the like. A handheld instrument may communicate with any of the previously mentioned touch sensor, touch sensor types, or the like.

In one embodiment, the instrument touch module 120 may be configured to distinguish between a touch from the handheld instrument and a touch from a user, such as a user's finger, palm, wrist, or the like. In one example, an instrument touch module 120 may distinguish between a touch from the handheld instrument and a touch from a user based on the size of the touch.

In another example, the handheld instrument may be configured to include a unique shape at the touching end of the handheld instrument. For example, a handheld instrument may be a pen, or stylus, and the touching tip of the pen may include a "+" or a "*", or the like, at the tip. Of course, other symbols may be used to allow the instrument touch module 120 to determine that a touch is from a handheld instrument, or from a user's finger, wrist, palm, or the like. Therefore, in one embodiment, the instrument touch module 120 may distinguish between a user touch and an instrument touch based on the detected shape at the touch point of a handheld instrument.

In another embodiment, an instrument touch module 120, may be configured to differentiate between a user touch and a touch from a handheld instrument based on pressure sensor at a touch point of a handheld instrument. If the pressure sensor at a touch point of the handheld instrument detects a pressure, then a touch point may more likely be from the handheld instrument.

In another embodiment, an instrument touch module 120 may be configured to differentiate between a user touch and a touch by a handheld instrument by using an active stylus. In one example, a touch sensor may be made more sensitive to an active stylus such that when a user's hand holding an active stylus is approaching a touch screen, the touch sensor may detect the active stylus before the user touches the touch screen with a wrist, palm, or the like.

In one embodiment, the apparatus 100 includes the user touch module 140. In another embodiment, the user touch module 140 may be configured to disable a portion of the touch screen in response to the instrument touch, the disabled portion based on a usage pattern. In one example, the user touch module 140 may disable all touch sensor for the disabled area. In another example, the user touch module 140 may disable one of the touch inputs for the touch screen. Therefore, in certain embodiment, some of the touch inputs may be disabled for the disabled portion of the touch screen, while other touch inputs may not be disabled for the disabled portion of the touch screen. Therefore, a disabled portion may still operate for other touch sensors. In one example, the user touch module 140 may disable a portion for capacitive touch, while still accepting touches from a handheld instrument based on magnetic resonance. Of course, a computing device may include many different touch inputs, and the user touch module 140 may disable one of the touch inputs, or many of the touch inputs, or all of the touch inputs for a portion of the touch screen.

In one embodiment, a usage pattern may include any repeated or repeatable touch pattern by a user. A user of a computing device that includes the touch module 140 may register touches in similar ways when using a handheld instrument, or in another way. Therefore, in one embodiment, a usage pattern may include these touches and may recognize similarities between the touches. Identified similarities in touches by a user using a handheld instrument may include patterns of consistent touches by a user.

It is not necessary that a user touch a touch screen in a precise pattern to match a usage pattern. In one example, a user may touch a touch screen and the touch module 140 may receive the touch. The received touch may include interacting with the touch screen to cause a touch to be registered, wherein the touch includes 90% of a usage pattern and the touch module may disable one of the touch inputs for the touch screen. In another example, the received touch include the usage pattern and additional space on the touch screen. Of course, other percentages may be used and this disclosure is not limited in this regard. In another example, the received touch may be smaller or larger than the usage pattern. In one example, if the received touch is within 10% of the area of a usage pattern, then the touch module 140 may disable one of the touch inputs for the touch screen. In other examples, the received touch may include different dimensions, borders, or the like, therefore, a received touch may only to be similar to a usage pattern for the touch module 140 to disable one of the touch inputs.

In one embodiment, the user touch module 140 may distinguish between a user's hand that may be using a handheld instrument, and another hand of the user. Based on a location, orientation, usage pattern, or the like, the user touch module 140 may determine between a user touch from the hand using the handheld instrument and a touch from a free hand of the user, or another hand, or the like. The user touch module 140 may disable a portion of the touch screen based on a location of the touch from the handheld instrument.

In one example, the user touch module 140 may disable a portion to the right based on the user being right handed. In one example, the user touch module 140 may disable a portion to the right by disabling a triangle portion from the touch point of a handheld instrument. The touch module 140 may disable a portion based on a usage pattern. For example, the user touch module 140 may disable a portion based on an angle of degrees from the point of a touch for a handheld instrument. In another example, the user touch module 140 may disable a portion of the touch screen that is substantially similar to a palm check by a hand using a handheld instrument. In another example, the user touch module 140 may disable a portion that is an oval encompassing an area to one side of the touch of a handheld instrument. In another example, the user touch module 140 may disable a portion based on any other shape encompassing an area in spatial proximity to a touch by a handheld instrument.

In another example, the user touch module 140 may disable a portion to the left based on the user being left handed. In one example, the user touch module 140 may disable a left portion of the touch screen from the touch point of the handheld instrument. In one example, the left portion may be a left side of the screen from the touch point of the handheld instrument to the left edge of the touch screen.

In another example, the user touch module 140 may disable a top portion of the touch screen based on a user arcing a hand above. In this example, a user may touch the touch screen of the computing device with a handheld instrument, and may contact a portion of the screen above the touch point. Based on a user interaction with the computing device, or the user touching a portion of the computing device, the user touch module 140 may disable the portion above the touch location of the handheld instrument. This may cause the computing device to ignore a user touch above the touch location of the handheld instrument, but register touches in other locations on the touch screen (e.g. locations below the touch point of the handheld instrument).

In one example, the disabled portion of the touch screen may begin at a touch location for the handheld instrument and disable an angle portion of the touch screen from the touch location of the handheld instrument. For example, where 0 degrees is vertical an angle portion from 0 degrees to 90 may include an upper right quarter of the touch screen. Therefore, the user touch module 140 may disable a portion of the touch screen for user touch, based on a range of degrees. Of course, other ranges of degrees may be used.

In one embodiment, the user touch module 140 may disable a portion of the touch screen based on an orientation of the handheld instrument. For example, the user touch module 140 may disable a range of degrees based on an orientation of the handheld instrument. In one example, an orientation of a handheld instrument touching a touch screen of the apparatus 100 and may be leaning towards 30 degrees. The user touch module 140 may disable an arc range of 45 degrees to 135 degrees from the touch point of the handheld instrument. Therefore, the user touch module 140 may include both a location of a touch by a handheld instrument and an orientation of the handheld instrument.

By disabling a portion of the touch screen for user touch, the user touch module 140 may distinguish between a user's hand that is using the handheld instrument, and another hand. Therefore, touches from a user's hand that is using the handheld instrument may be ignored, while other touches may be received and processed by the apparatus 100. Therefore, in one embodiment, the apparatus 100, or the user touch module 140 may ignore touches by the user's hand using the handheld instrument, while the other hand of the user may perform other touch operations via the touch screen of the apparatus, such as, but not limited to, panning, scrolling, zooming, pressing buttons, or otherwise interacting with the apparatus 100.

Figure 2:
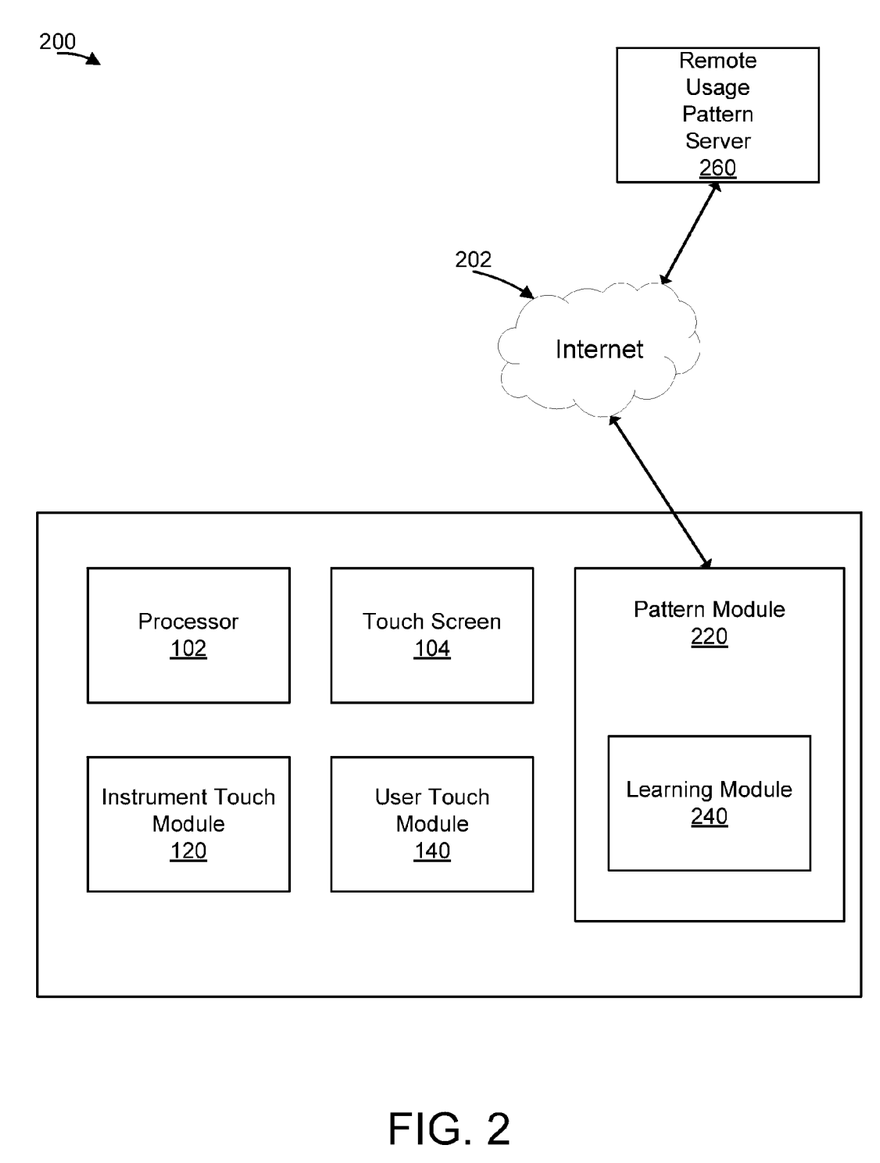
FIG. 2 is another schematic block diagram illustrating one embodiment of an apparatus for managing multiple touch sources with palm rejection.

FIG. 2 is another schematic block diagram illustrating one embodiment of an apparatus for managing multiple touch sources with palm rejection. In one embodiment, the apparatus 200 may include a processor 102, a touch screen 104, an instrument touch module 120, the user touch module 140, and a pattern module 220. The processor 102, the touch screen 104, and instrument touch module 120, and the user touch module 140 may or may not be substantially similar to those depicted in FIG. 1. In one embodiment, the pattern module 220 may include the learning module 240. In another embodiment, the pattern module 220 may be configured to store one more usage patterns. A usage pattern, as described herein, may include any pattern of touches by a user of the apparatus 200.

In one example, a usage pattern may include a right handed user touching a portion of the touch screen to the right of the touch location for the handheld instrument. In another example, a usage pattern may include a left handed user touching a portion of the touch screen to the left of the touch location for the handheld instrument. Because a user may hold a handheld instrument in consistent manners over many touches, the user touches by a hand of the user using the handheld instrument may be consistent. Therefore, a usage pattern may include a pattern that may represent a substantial portion of the user touches associated with the user using the handheld instrument.

In one example, a usage pattern may include a statistical average of touches by a right handed user.

Therefore, in one embodiment, the user touch module 140 may disable a portion of the touch screen for user touch that is consistent with the usage pattern for the user using the handheld instrument. The usage pattern may be based on historical use of the apparatus 200. In another example, a usage pattern may be based on a heuristic usage pattern, or the like. Therefore, in one embodiment, the pattern module 220 may store many usage patterns. In one example, the user touch module 140 may disable a portion of the touch screen for the apparatus 200 based on one or more of the usage patterns stored by the pattern module 220.

In one embodiment, the pattern module 220 may be further configured to receive one or more usage patterns from a remote usage pattern server 260. A remote usage pattern server 260 may receive usage patterns from other computing devices where the usage patterns may be based on heuristic models, or an analysis of historical use from one or more other computing devices. The remote usage pattern server 260 may store many usage patterns that may include, but is not limited to, right handed usage patterns, left handed usage patterns, top writing usage patterns, other configurations or arrangements of palm checks, wrist touches, or the like, or other patterns of use for a touch screen for any other computing device. A top writing pattern may represent a user who curl a hand around a handheld instrument such that the user's hand may touch the touch screen of the apparatus above a touch point of the handheld instrument.

In one embodiment, the pattern module 220 may receive one or more usage patterns from a remote usage pattern server 260. The user touch module 140 may disable a portion of the screen based on one or more received usage patterns received from the remote usage pattern server 260. The pattern module 220 may communicate with the remote usage pattern server 260, via the Internet 202, another network, or the like.

In another embodiment, the pattern module 220 may include the learning module 240. The learning module 240 may be configured to generate a usage pattern based on a user using the apparatus 200. In one example, the user module 140 may recognize a consistent user touch at one location relative to a touch from a handheld instrument, and may generate a usage pattern based on the recognized pattern of touches.

In one example, a right handed user may consistently touch the touch screen of the apparatus 200 at a right side relative to the touch point for the handheld instrument. In another example, a left handed user may consistently touch the touch screen of the apparatus 200 at a left side relative to the touch point for the handheld instrument. The learning module 240 may recognize the consistent touches in any other pattern and generate a usage pattern corresponding to a consistent recognized pattern of touches.

In one embodiment, the learning module 240 may be configured to generate the usage pattern based on training or enrollment period with a user. In one example, the learning module 240 may execute an application that asks the user to touch the touch screen of the apparatus 200 using at a set of predetermined locations. The application may also request that a user not touch the screen in any other locations. The learning module 240 may record locations where the user may inadvertently touch the screen with a palm, wrist, finger, or other, while the user is touching the touch screen with the handheld instrument. The learning module 240 may determine a usage pattern based on user touches associated with the predetermined set of touches at the predetermined locations using the handheld instrument. Therefore, the learning module 240 may learn a usage pattern from a user of the computing device. In another embodiment, the user touch module 140 may adjust the disabled portion of the touch screen for the apparatus 200 based on the learned usage pattern.

In one example, the user may execute the training application while initially setting up the apparatus 200. In another example, the user may execute the training application periodically, based on current accuracy of current usage patterns. According to certain embodiments, the learning module 240 may adjust a usage pattern based on the user executing the training application. In another embodiment, the learning module 240 may adjust a usage pattern based on the user using the apparatus 200. For example, where the apparatus registers several inadvertent touches associated with a user using a handheld instrument, the learning module 240 may adjust a current usage pattern to include the inadvertent touch regions. Therefore, in one embodiment, the learning module 240 may adjust a usage pattern based on historical usage of the apparatus 200.

In one embodiment, the pattern module 220 is further configured to transmit the generated usage pattern to a remote usage pattern server 260. In one example, the pattern module 220 may transmit a usage pattern based on a training application to the remote usage pattern server 260. In another embodiment, after the learning module 240 adjust a usage pattern, the pattern module 220 may transmit the adjusted usage pattern to the remote usage pattern server 260. In other embodiments, the learning module 240 may generate a usage pattern, and the pattern module 220 may transmit any other usage pattern to the remote usage pattern server 260.

In one example, many learning modules 240 at respective computing device may generate respective usage patterns and transmit the usage patterns to a remote usage pattern server 260. The remote usage pattern server 260 may combine usage patterns from many learning module 240 and generate a crowd sourced usage pattern based on the many usage patterns received.

In one embodiment, the learning module 240 may update a usage pattern based on results from crowd sourcing and/or clustering techniques. Crowd sourcing, as described herein, may at least include, receiving many usage patterns from a wide variety of sources, including, but not limited to, generated usage patterns from learning modules 240, heuristic modeling by combining usage patterns defined by a user, an engineer, or the like, and learned usage patterns based on historical use. Crowd sourcing may include many usage patterns submitted to a remote usage pattern server by a collaboration of a community of online users. Therefore, in one example, a remote usage pattern server 260 may select portions of many usage patterns and combine them to generate an additional usage pattern. In another example, a remote usage pattern server 260 may generate an additional usage pattern based on a statistical average of a set of received usage patterns.

For example, a remote usage pattern server 260, or a learning module 240, may combine a set of received usage patterns for right handed users, and may calculate a statistical average of the right handed usage patterns. Of course, a learning module 240, or a remote usage pattern server 260 may combine usage patterns in other sets, such as, but not limited to, right handed, left handed, right handed over, left handed over, left handed children, right handed children, very large patterns (e.g. top 5-10% of usage pattern sizes), very small patterns (e.g. bottom 5-10% of usage pattern sizes), or other sets of usage patterns, as one skilled in the art may recognize.

The generated usage pattern may not be similar to any of the received usage patterns, but this is not necessarily the case. In other embodiments, crowd sourcing may include distributed tasking, broadcast searches, peer-vetted production, crowdvoting, crowdsearching, macrowork, microwork, or the like, and one skilled in the art may recognize other ways to assembly large sets of usage patterns for the remote usage pattern server 260 to consider.

In one embodiment, the remote usage pattern server 260 may store many different usage patterns. Furthermore, as the remote usage pattern server 260 receives additional usage patterns, the usage pattern server 260 may update usage patterns based on the received usage patterns. The remote usage pattern server 260 may combine the received usage patterns to generate other usage patterns based on real and live results from users of the computing devices according to various embodiments. In another embodiment, the remote usage pattern server may transmit the updated usage pattern to the pattern module 220. Therefore, over time, many pattern modules 220 may cooperate to generate usage patterns with increased quality, and the pattern modules 220 may all increase in accuracy and reliability.

Figure 3:
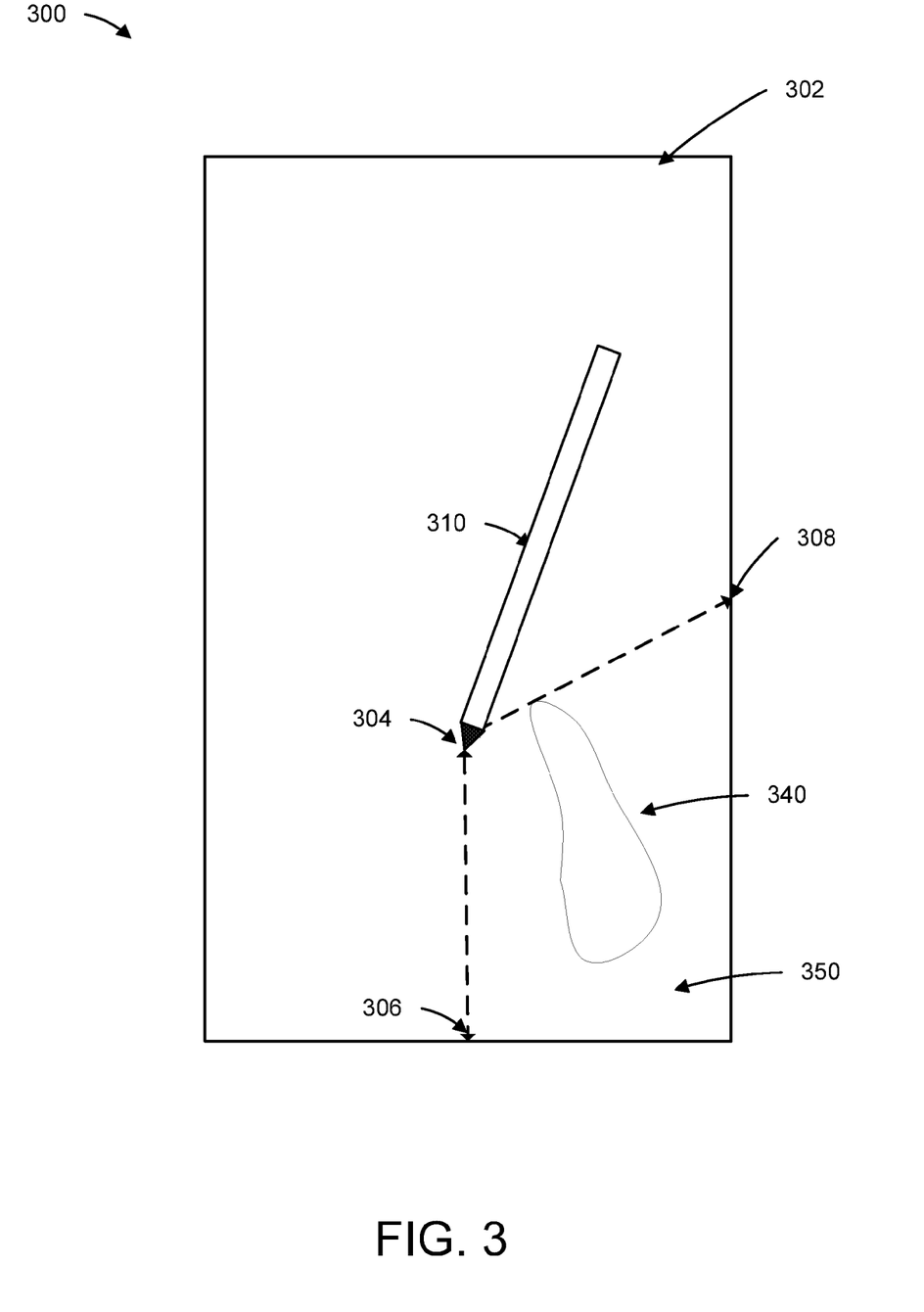
FIG. 3 is a schematic block diagram illustrating one embodiment of multiple touch sources with palm rejection.

FIG. 3 is a schematic block diagram illustrating one embodiment 300 of multiple touch sources with palm rejection. In one embodiment, an apparatus may include a touch screen 302. The touch screen 302 may communicate or implement any of the aforementioned touch sensors or touch sensor types, or the like. In one embodiment, a touch instrument may be a stylus or pen 310. The touch instrument 310 may touch the touch screen at a location 304.

In one embodiment, a current usage pattern may include a usage pattern for a right handed user. Therefore, the usage pattern may indicate an expected palm rest 340 at a right side of the location 304. Based on the usage pattern, the user touch module 140 may disable a portion 350 of the touch screen for user touch. The disabled portion may ignore touches from a user, but may still register touches from the handheld instrument. In one embodiment, the user touch module 140 may disable a portion 350 that includes a bottom right corner of the touch screen. In one example, one border for the disabled portion may extend from the location 304 of the handheld instrument to an edge 308 of the screen. In another example, another border for the disabled portion may extend from the location 304 to another edge 306 of the touch screen. The borders of the disabled portion may include a range of degrees from one angle based on location 304 to edge 308, and another angle based on location 304 to edge 306. Of course, other angles may be used and this disclosure is not limited in this regard.

In another embodiment, the user touch module 140 may disable the portion 350 based on an orientation of the handheld instrument. In one example, the styles 310 may be leaning at 20 degree clockwise from vertical. Based on that orientation, the user touch module 140 may disable the portion 340.

Figure 4:
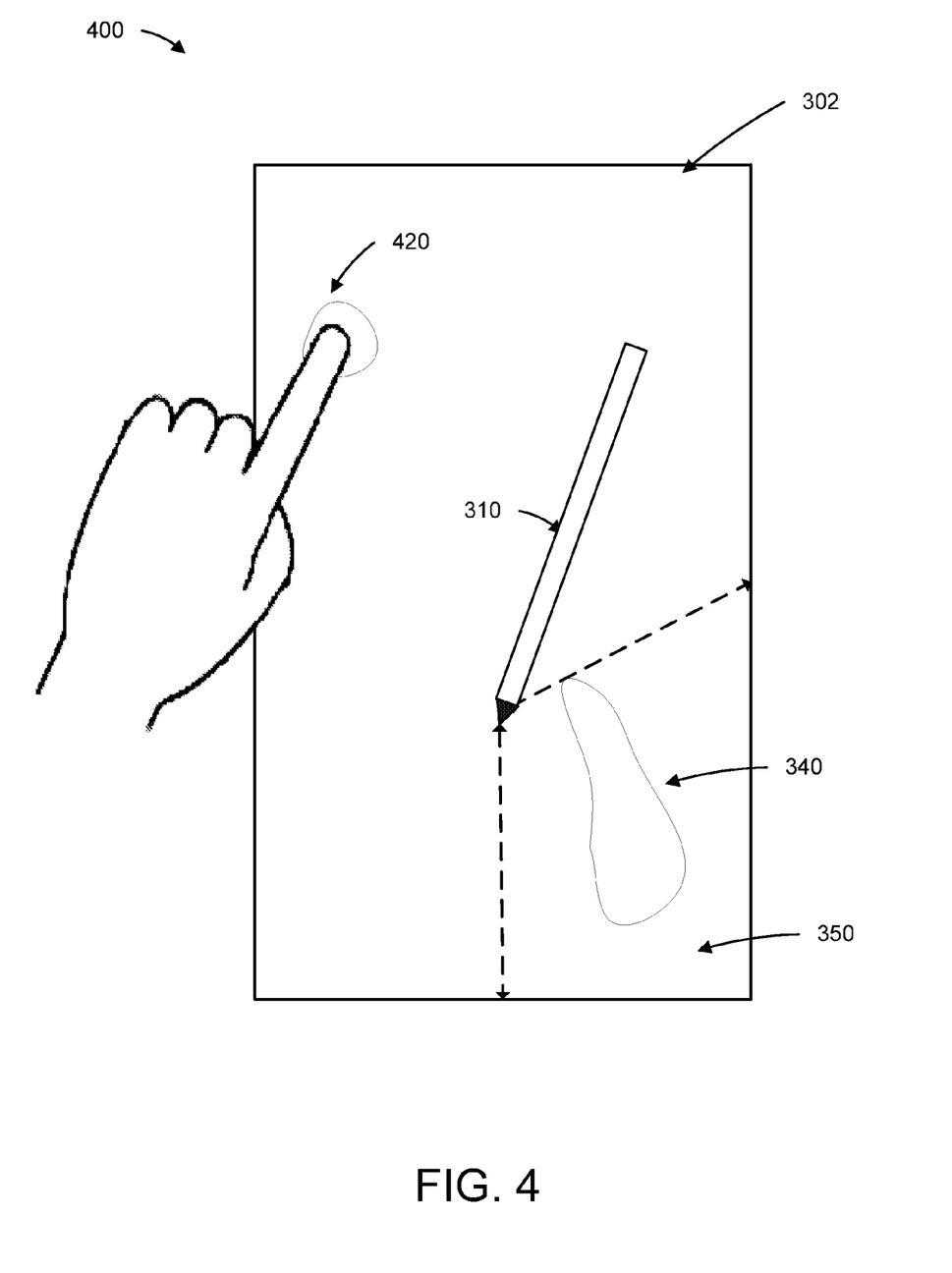
FIG. 4 is an illustration illustrating one embodiment of multiple touches on a touch screen.

FIG. 4 is an illustration illustrating one embodiment 400 of multiple touches on a touch screen 302. One embodiment may include a touch screen 302, a handheld instrument 310, a palm check 340, a disabled portion 350 of the touch screen, and another user touch 420 from another hand of a user. The touch screen 302, the handheld instrument 310, the palm check 340, and the disabled portion 350 may or may not be substantially similar to those depicted in FIG. 3.

In one embodiment, a user may touch the touch screen 302 in an additional location 420. Because the user touch module 140 may have disabled the portion 350 in another area, the user may still touch 420 the touch screen 302 outside of the disabled portion 350 and the apparatus may accept the touch 420. Therefore, in one embodiment, the user touch module 140 may disable touches 340 based on a hand using the handheld instrument 310, but may still accept touches 420 at other locations on the touch screen 302.

Figure 5:
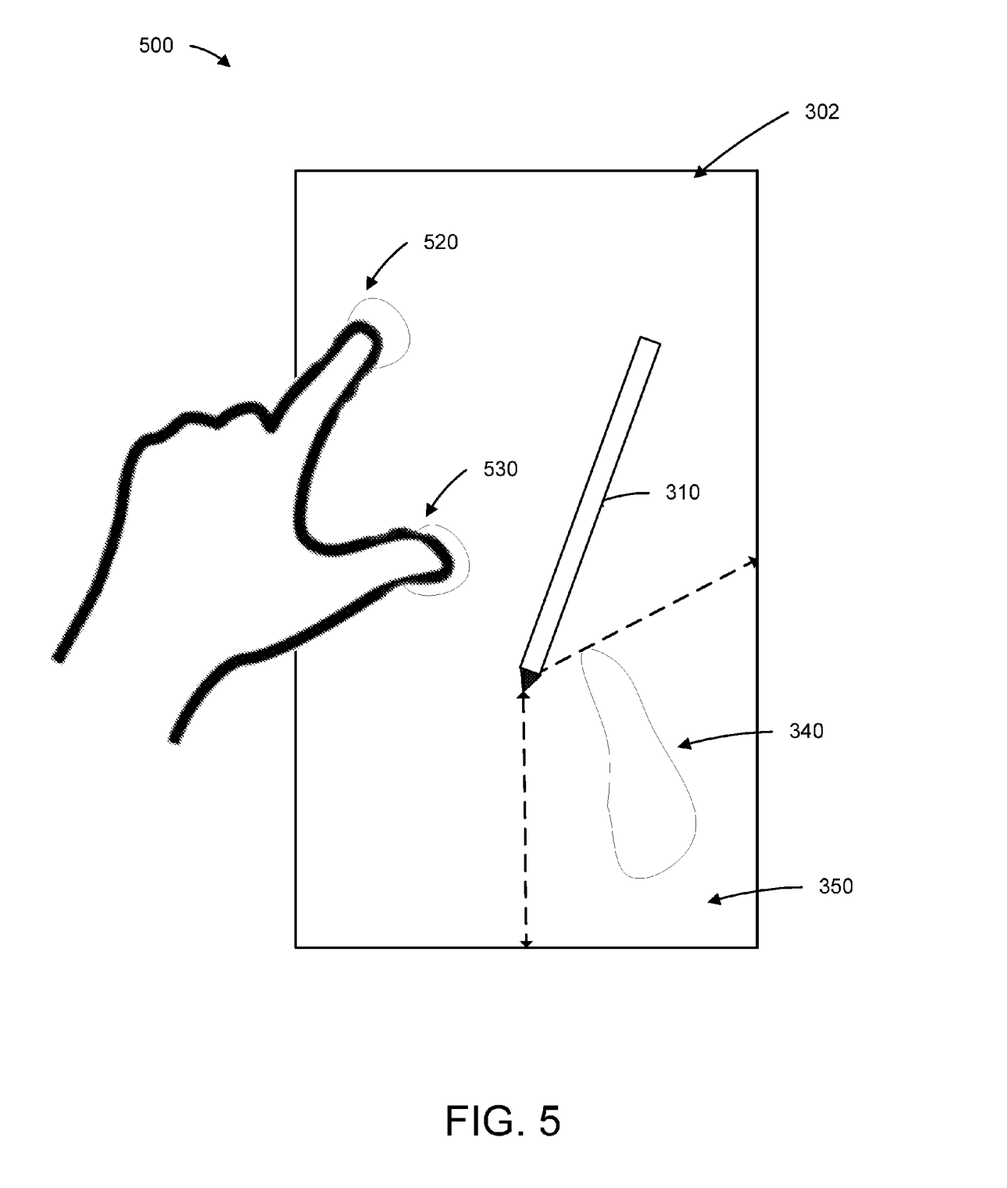
FIG. 5 is an illustration depicting one embodiment of a multiple touches on a touch screen.

FIG. 5 is an illustration depicting one embodiment of a multiple touches on a touch screen. One embodiment may include a touch screen 302, a handheld instrument 310, a palm check 340, a disabled portion 350 of the touch screen, and a multi-touch 520, 530 from another hand of a user. The touch screen 302, the handheld instrument 310, the palm check 340, and the disabled portion 350 may or may not be substantially similar to those depicted in FIG. 3. The disabled portion 350 may be defined by another range of degrees, another shape as previously described, or the like that may encompass an expected user touch by a user's hand using the touch instrument 310.

In one embodiment, a user may touch the touch screen 302 in an additional location 520,530. Because the user touch module 140 may only have disabled the portion of the touch screen as indicated in portion 350, the user may still touch the touch 420 screen outside of the disabled portion 350 and the apparatus may accept the multi-touch 520,530. Therefore, in one embodiment, the user touch module 140 may disable touches 340 based on a hand using the handheld instrument 310, but may still accept touches 520,530 at other locations on the touch screen 302. In one example, the touches 520,530 may include a multi-touch. A multi-touch may command the computing device to perform a wide variety of actions, such as, but not limited to, scrolling, panning, rotating, zooming in, zooming out, selecting buttons, other options, or the like, and this disclosure is not limited in this regard.

Figure 6:
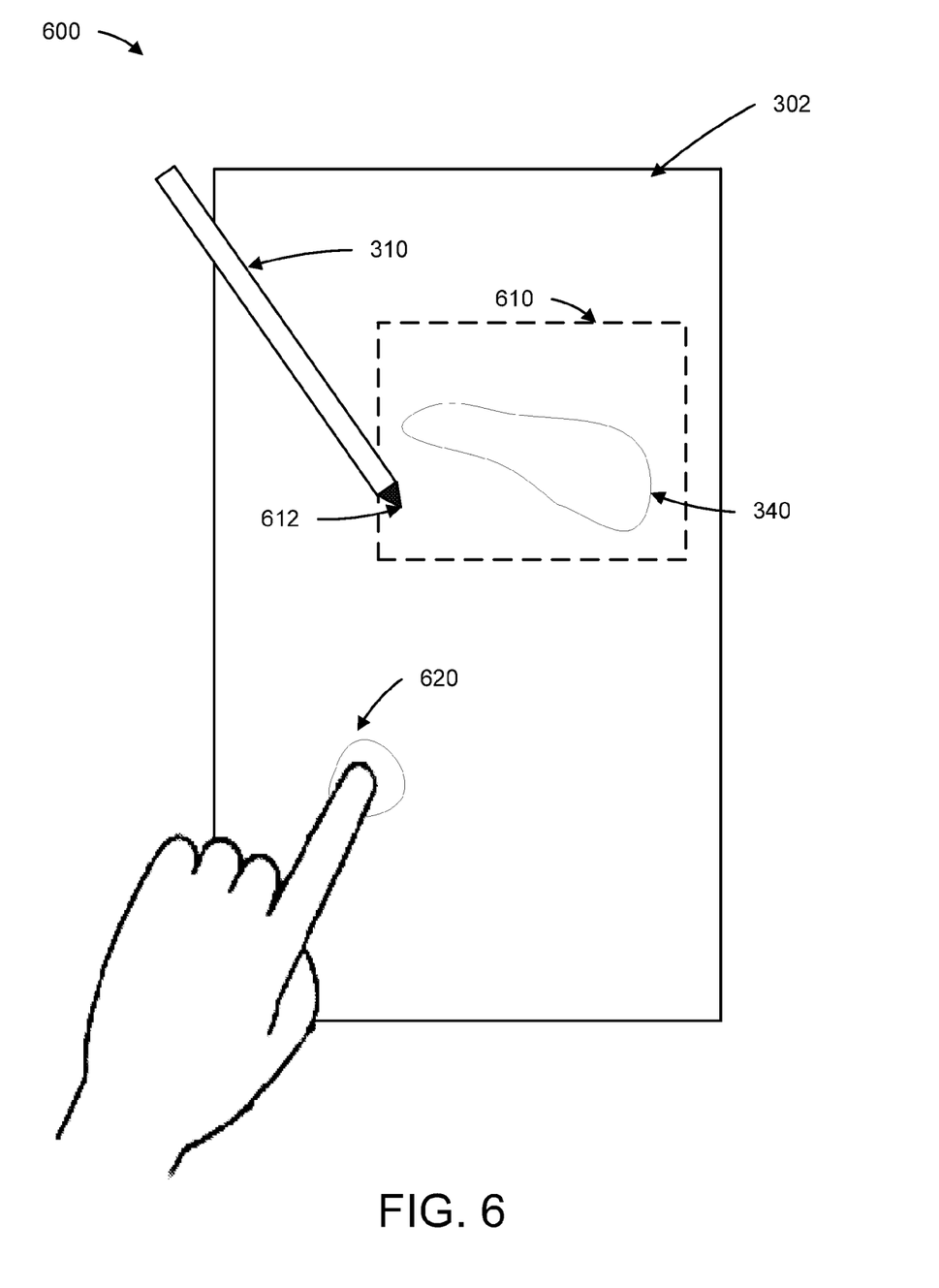
FIG. 6 is another illustration depicting one embodiment of multiple touches on a touch screen.

FIG. 6 is another illustration depicting one embodiment 600 of multiple touches on a touch screen. One embodiment may include a touch screen 302, a handheld instrument 310, a palm check 340, a disabled portion 610 of the touch screen, and another user touch 620 from another hand of a user. The touch screen 302, and the handheld instrument 310 may or may not be substantially similar to those depicted in FIG. 3.

In one embodiment, the user touch module 140 may disable a portion 610 that is a rectangle in shape. Of course, any other shape may be used to define a disabled portion as previously described. In one example, a palm check 340 may be located to the right of a touch 612 from a handheld instrument 310. In this example, the usage pattern may indicate that a user may consistently palm check 340 the touch screen 302 in a region enclosed by the rectangle portion 610.

In one embodiment, a user may touch the touch screen 302 in an additional location 620. Because the user touch module 140 may have disabled the portion 610 in another area, the user may still touch 620 the touch screen 302 outside of the disabled portion 610 and the apparatus may accept the touch 620. Therefore, in one embodiment, the user touch module 140 may disable touches 340 based on a hand using the handheld instrument 310, but may still accept touches 620 at other locations on the touch screen 302. Of course, in many other example, the disabled portion 610, and the other touches 620 may be located at any areas of the touch screen 302. Therefore, as long as the other touch 620 is located outside of the disabled portion 610, the user touch module 140 may accept the other touch 620 although a portion 610 of the touch screen may be currently disabled for user touch.

Figure 7:
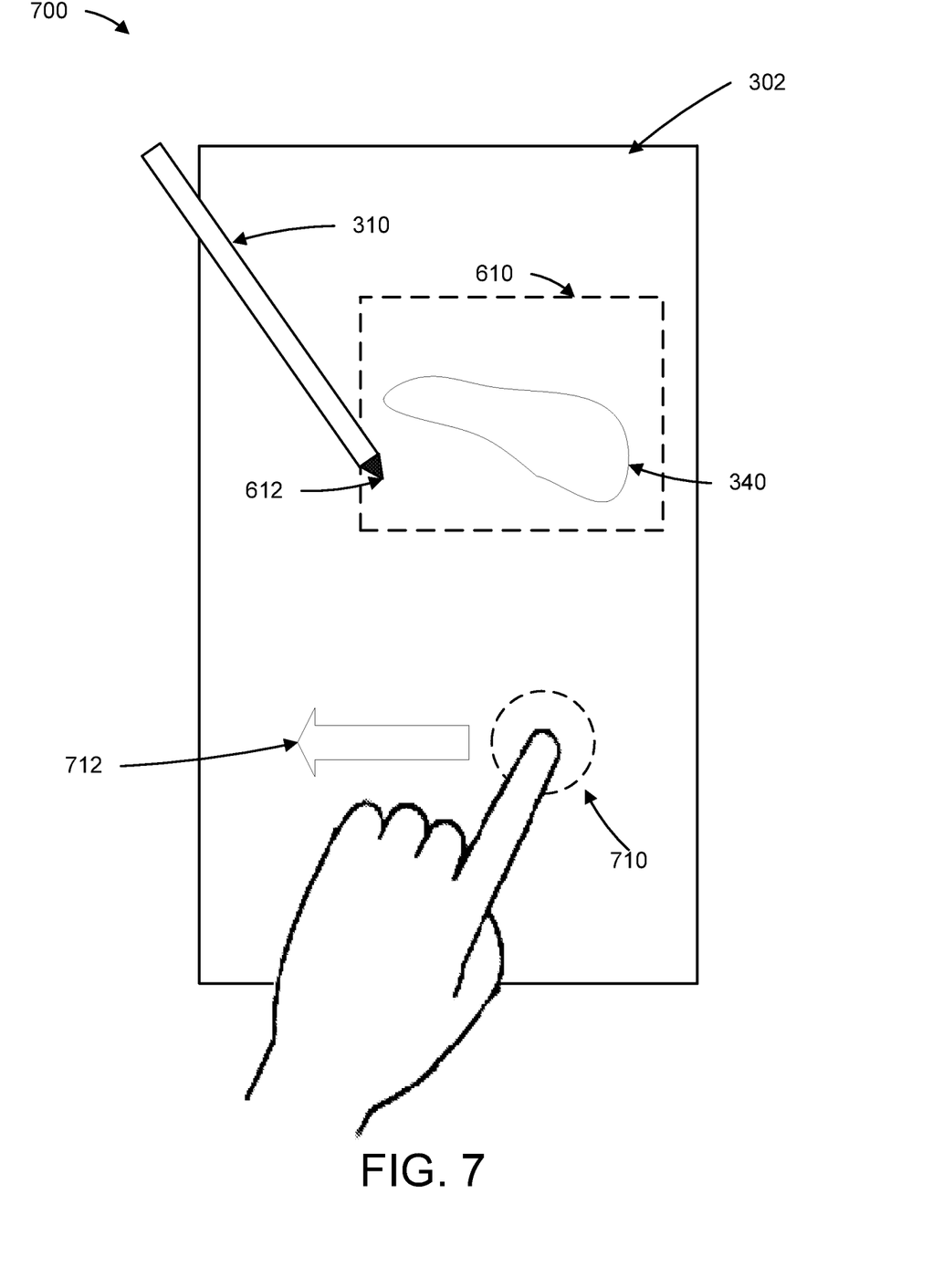
FIG. 7 is one illustration depicting one embodiment of multiple touches on a touch screen.

FIG. 7 is one illustration depicting one embodiment of multiple touches on a touch screen. One embodiment may include a touch screen 302, a handheld instrument 310, a palm check 340, a disabled portion 610 of the touch screen, and another user touch 710,712 from another hand of a user. The touch screen 302, the palm check 340, the disabled portion 610, and the handheld instrument 310 may or may not be substantially similar to those depicted in FIG. 6.

In one embodiment, the user touch module 140 may disable a portion 610 that is a rectangle in shape. Of course, any other shape may be used to define a disabled portion as previously described. In one example, a palm check 340 may be located above and to the right of a touch 612 from the handheld instrument 310. In this example, the usage pattern may indicate that a user may consistently palm check 340 the touch screen 302 in a region enclosed by the rectangle portion 610.

In one embodiment, a user may touch the touch screen 302 in an additional location 620. Because the user touch module 140 may have disabled the portion 610 in another area, the user may still touch 620 the touch screen 302 outside of the disabled portion 610 and the apparatus may accept the touch 620. Therefore, in one embodiment, the user touch module 140 may disable touches 340 based on a hand using the handheld instrument 310, but may still accept touches 720 at other locations on the touch screen 302.

In one embodiment, the other touches 710,712 may include a gesture. Therefore, although a portion 610 of the screen may be disabled for user touch, a user may still issue other touches in other locations on the touch screen 302. Of course, in many other example, the disabled portion 610, and the other touches 710,712 may be located at any areas of the touch screen 302. Therefore, as long as the other touches 710,712 are located outside of the disabled portion 610, the user touch module 140 may accept the other touches 710,712 although a portion 610 of the touch screen may be currently disabled for user touch.

Figure 8:
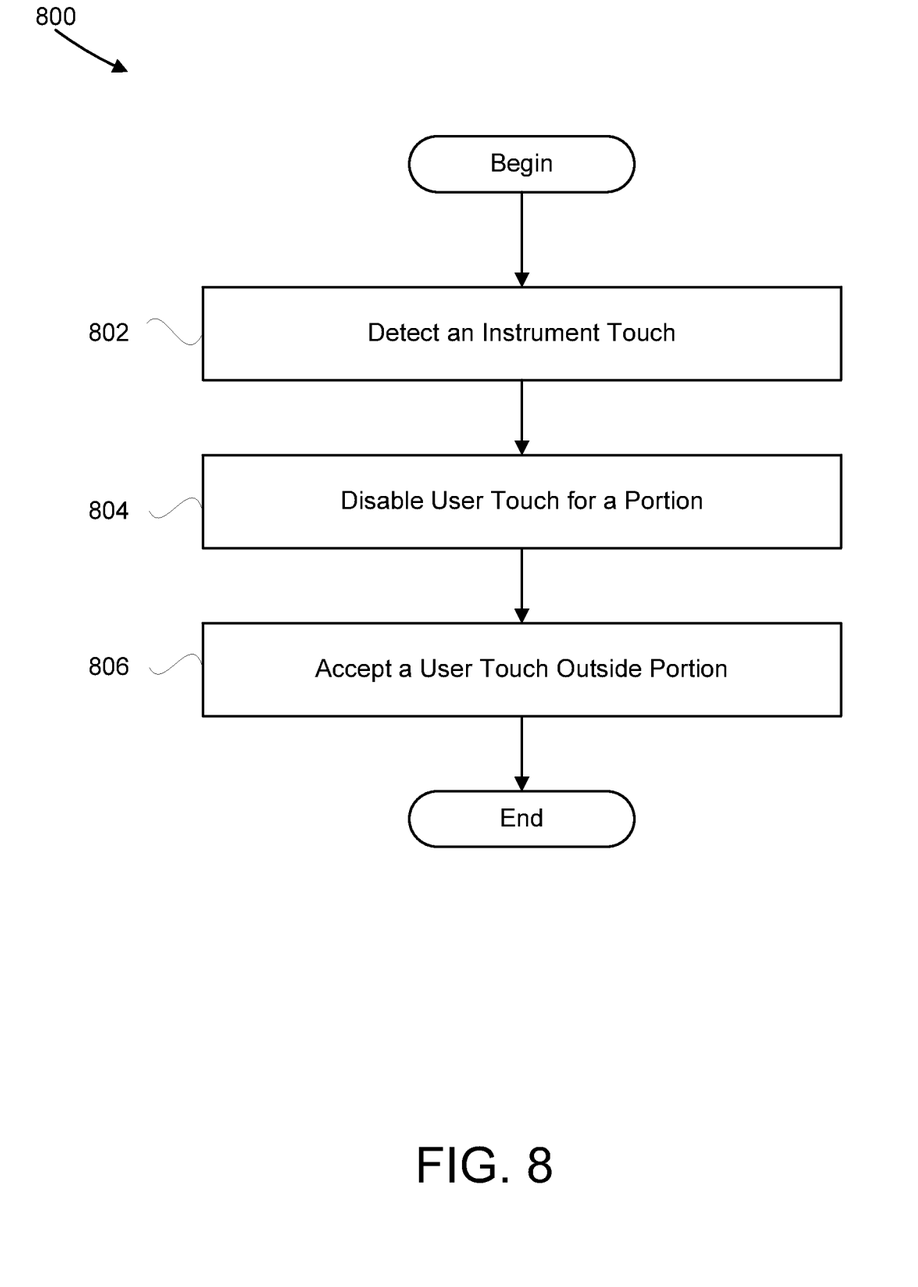
FIG. 8 is one schematic flow chart diagram illustrating one embodiment of a method for managing multiple touch sources with palm rejection.

FIG. 8 is one schematic flow chart diagram illustrating one embodiment of a method 800 for managing multiple touch sources with palm rejection. In one embodiment, the method may begin and the instrument touch module 120 may detect an instrument touch on a touch screen of a computing device. In another embodiment, the instrument touch may be performed by a handheld instrument. A user touch module 140 may disable user touch for a portion of the touch screen. In another embodiment, the disabled portion may be selected in accordance with a usage pattern. The user touch module 140 may accept a user touch of the touch screen outside of the disabled portion, and the method 800 may end.

Figure 9:
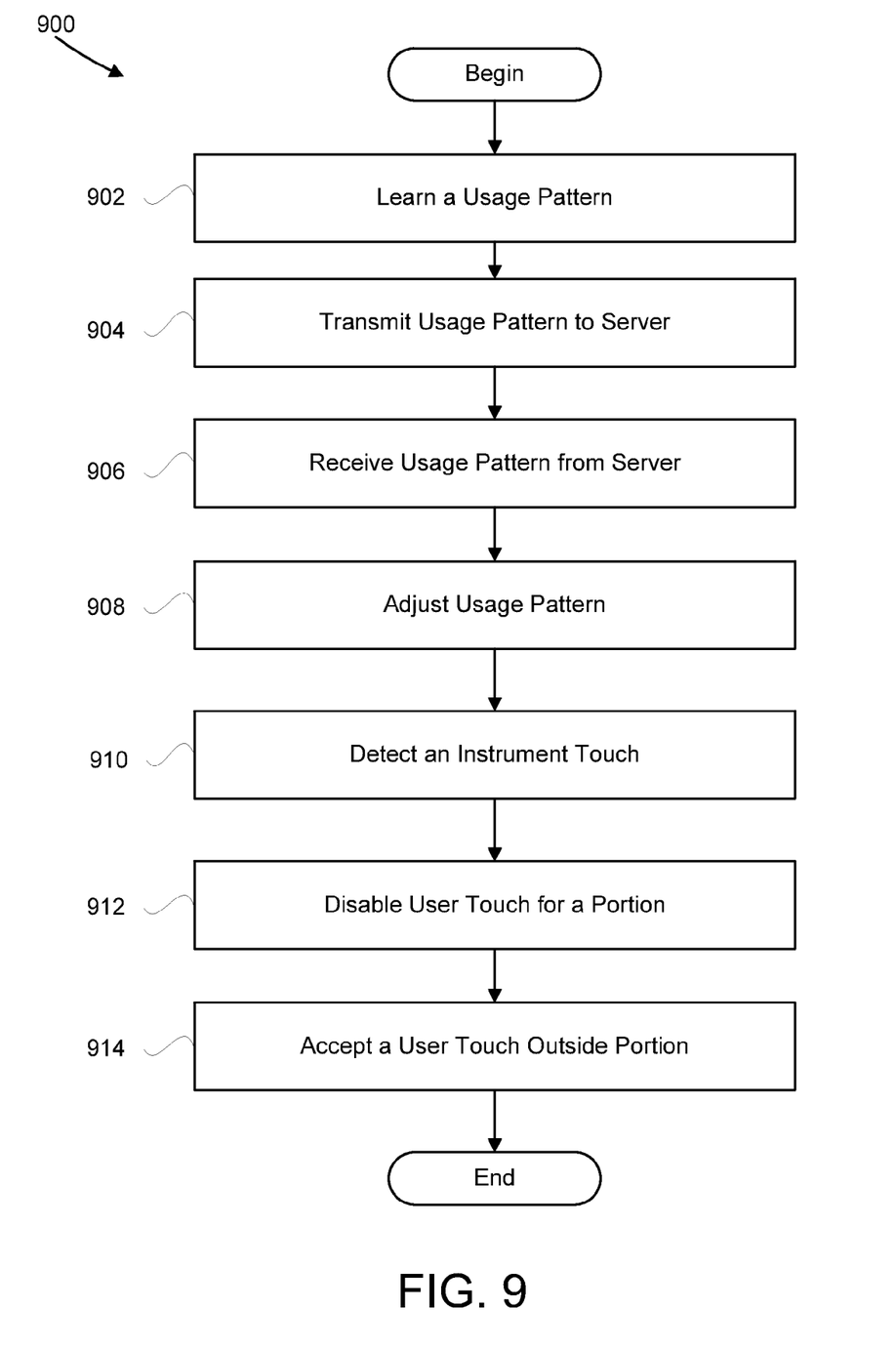
FIG. 9 is another schematic flow chart diagram illustrating one embodiment of a method for managing multiple touch sources with palm rejection.

FIG. 9 is another schematic flow chart diagram illustrating one embodiment of a method for managing multiple touch sources with palm rejection. In one embodiment, the method 900 may begin and the learning module 240 may learn 902 a usage pattern. The pattern module 220 may transmit 904 the learned usage pattern to a remote usage pattern server 260. The pattern module 220 may receive 906 another usage pattern from the remote usage pattern server 260. The pattern module 220 may adjust 908 the received usage pattern. The instrument touch module 120 may detect 910 a touch by a handheld instrument. The user touch module 140 may disable 912 a portion of the touch screen for user touch. The user touch module 140 may accept 914 a user touch outside of the disabled portion of the touch screen and the method may end.

Figure 10:
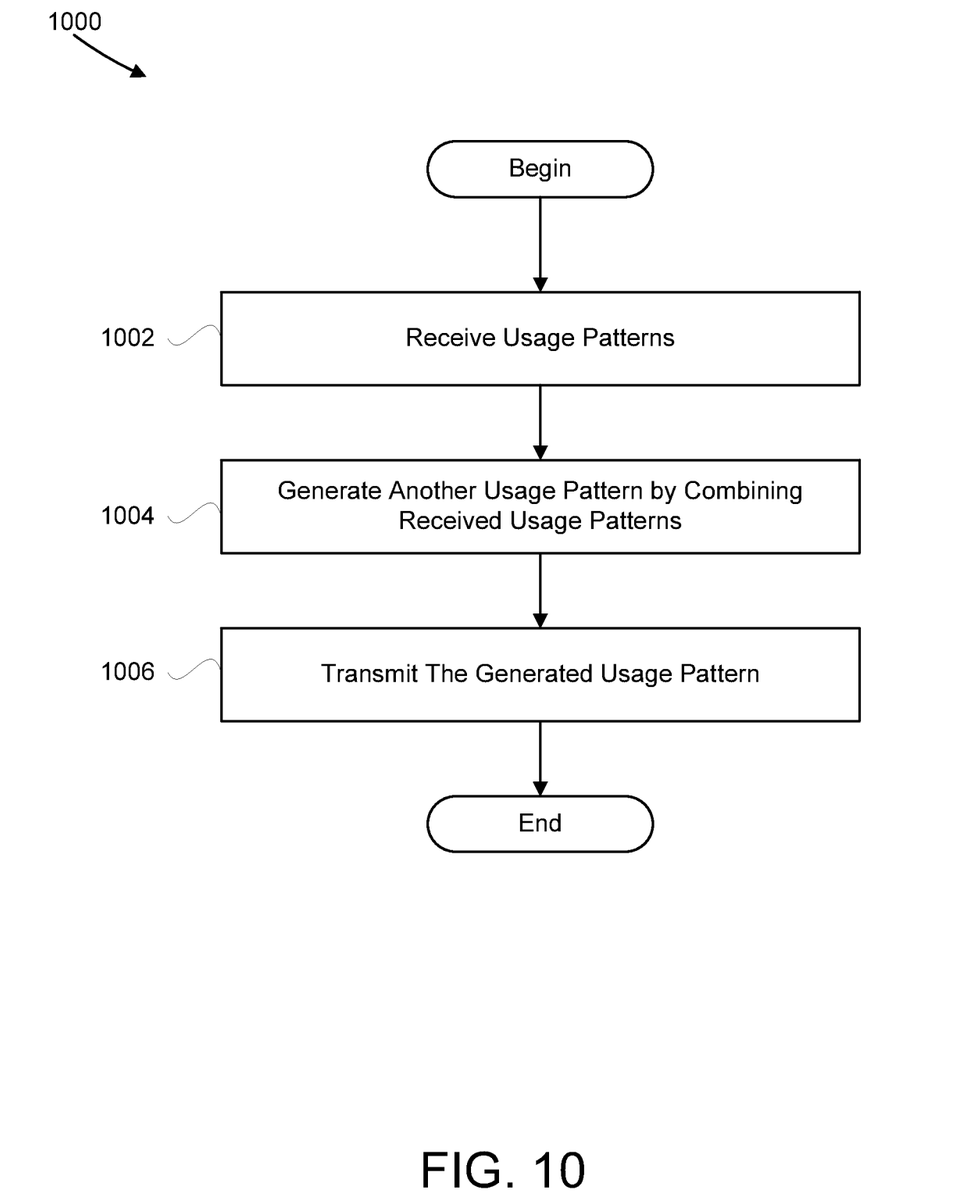
FIG. 10 is another schematic flow chart diagram illustrating one embodiment of a method for generating usage patterns with palm rejection.

FIG. 10 is another schematic flow chart diagram illustrating one embodiment of a method 1000 for generating usage patterns with palm rejection. The method 1000 may begin and a remote usage pattern server may receive 1002 one or more usage patterns from one or more learning modules. The remote usage pattern server 260 may generate an additional usage pattern by combining one or more of the received usage patterns, the combining using one or more of statistical averaging, crowd sourcing, and heuristic modeling. The remote usage pattern server 260 may transmit the additional usage pattern to one of the learning modules, and the method 1000 may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a touch screen operatively coupled to the processor;
an instrument touch module that detects, at the touch screen, a touch from a handheld instrument;
a learning module that learns a usage pattern from a user of the computing device; and
a user touch module that disables user touch for a portion of the touch screen in response to the instrument touch, the disabled portion based on the usage pattern, wherein the portion of the screen is further based on a location of the instrument touch and an orientation of the handheld instrument.

2. The apparatus of claim 1, further comprising a pattern module that stores one or more usage patterns including the learned usage pattern, wherein the user touch module disables a portion of the touch screen based on a usage pattern selected from the stored one or more usage patterns based on user interaction.

3. The apparatus of claim 2, wherein the pattern module further receives the one or more usage patterns from a remote usage pattern server.

4. The apparatus of claim 2, wherein the pattern module further transmits the learned usage pattern to a remote usage pattern server.

5. The apparatus of claim 1, wherein the learning module learns the usage pattern based on training with a user.

6. The apparatus of claim 5, wherein the training comprises the user executing a training application.

7. The apparatus of claim 1, wherein the learning module adjusts a usage pattern based on a technique selected from the group consisting of crowd sourcing and historical use of the apparatus.

8. The apparatus of claim 1, wherein the user touch module accepts a touch from a user at a location outside the disabled portion of the touch screen.

9. A method comprising:
  detecting, by use of a processor, an instrument touch on a touch screen of a computing device, the instrument touch performed by a handheld instrument;
  learning a usage pattern from a user of the computing device;
  disabling user touch for a portion of the touch screen, the disabled portion selected based on the learned usage pattern, wherein the portion of the screen is further based on a location of the instrument touch and an orientation of the handheld instrument; and
  accepting a user touch of the touch screen outside of the disabled portion.

10. The method of claim 9, further comprising transmitting the learned usage pattern to a remote usage pattern server.

11. The method of claim 9, further comprising receiving one or more usage patterns from a remote usage pattern server.

12. The method of claim 9, further comprising adjusting the usage pattern based on historical use of the computing device.

13. A program product comprising a non-statutory computer readable storage medium that stores code executable by a processor to perform:
  detecting an instrument touch on a touch screen of a computing device, the instrument touch performed by a handheld instrument;
  learning a usage pattern from a user of the computing device;
  disabling user touch for a portion of the touch screen, the disabled portion selected-based on the learned usage pattern; and
  accepting a user touch of the touch screen outside of the disabled portion.

14. The program product of claim 13, the code further receiving the usage pattern from a remote usage pattern server.

15. The program product of claim 13, the code further transmitting a learned usage pattern to a remote usage pattern server.

16. The program product of claim 13, the code further adjusting the usage pattern based on historical use of the computing device.

17. The program product of claim 13, wherein the disabled portion is further based on a characteristic of the instrument touch selected from the group consisting of a location of the instrument touch, and an orientation of the handheld instrument.

18. An apparatus comprising:
  a processor;
  a touch screen operatively coupled to the processor;
  an instrument touch module that detects, at the touch screen, a touch from a handheld instrument;
  a learning module that learns a usage pattern from a user of the computing device; and
  a user touch module that disables a portion of the touch screen in response to the instrument touch, the disabled portion based on the learned usage pattern.

19. The apparatus of claim 18, further comprising a pattern module that stores one or more usage patterns including the learned usage pattern, wherein the pattern module receives a usage pattern from a remote usage pattern server and wherein the user touch module disables a portion of the touch screen based on a usage pattern selected from the stored one or more usage patterns based on user interaction.

20. The apparatus of claim 18, wherein the learning module adjusts a usage pattern based on a technique selected from the group consisting of crowd sourcing and historical use of the apparatus.

21. The apparatus of claim 18, wherein the user touch module accepts a touch from a user at a location outside the disabled portion of the touch screen.

\* \* \* \* \*